Dec. 30, 1958  R. P. WITT  2,866,948
TEST CIRCUIT FOR INTERCONNECTED COMPONENTS
Filed March 24, 1955

INVENTOR,
RICHARD P. WITT.
BY
Harry M. Saragovitz
ATTORNEY.

United States Patent Office 2,866,948
Patented Dec. 30, 1958

2,866,948
TEST CIRCUIT FOR INTERCONNECTED COMPONENTS

Richard P. Witt, Rockville, Md., assignor to the United States of America as represented by the Secretary of the Army Application March 24, 1955, Serial No. 496,629

1 Claim. (Cl. 324—62)

(Granted under Title 35, U. S. Code (1952), sec. 266)

The invention described herein may be manufactured and used by and for the Government for governmental purposes without the payment of any royalty thereon.

This invention relates to apparatus for making electrical measurements and more particularly to apparatus for measuring the value of an electrical component which is interconnected in a circuit with other components.

An object of the invention is to provide apparatus for quickly and accurately determining the value of a circuit component, which is interconnected with other circuit components, without the necessity of disconnecting the component to be tested.

In accordance with this invention the measurement may be made with good accuracy by utilizing a bridge of relatively low impedance.

Figure 1:
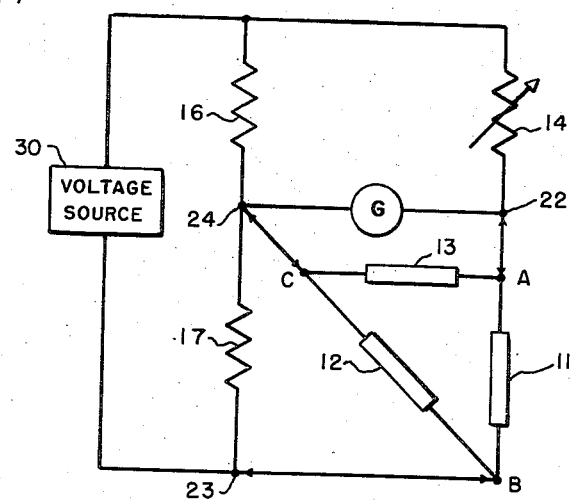
Figure 2:
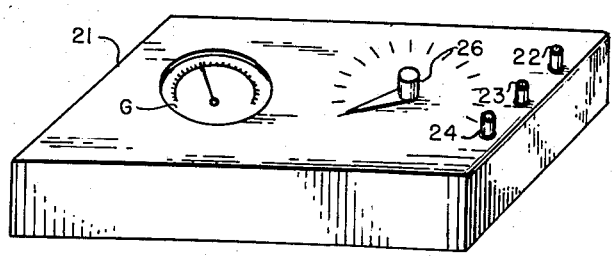

A complete understanding of the invention may be had by reference to the following description taken in conjunction with the accompanying drawing in which:

Fig. 1 is a circuit diagram of an apparatus embodying the invention, and Fig. 2 is a view of a possible arrangement of the apparatus.

Fig. 1 shows a bridge circuit having arms 11, 14, 16 and 17 and a galvanometer G. The block 11 represents the circuit component whose impedance is to be measured. Blocks 12 and 13 represent other components interconnected with component 11 which provide a "sneak" current path around component 11.

The arms 16 and 17 preferably consist of resistors, which may be in any desired ratio. A convenient ratio of the impedance of arm 16 to the impedance of arm 17 would be one to one in which case the impedance of arm 14 would be substantially equal to the impedance of component 11 when the bridge is balanced. The actual effective ratio of the arms 16 and 17 will not be one to one. Due to the shunting effect of component 12, the actual effective impedance of arm 17 will be less than that of arm 16.

The bridge will give accurate readings of the impedance of component 11 if the ratio of the impedance of arm 17 to the impedance of component 12 is less than the desired precision and if the impedance of component 13 is sufficiently high so that the galvanometer sensitivity is not seriously impaired.

One practical application used the following values:

Arm 16=200 ohms
Arm 17=200 ohms
Resistance of G=50 ohms

The mean value of component 11 was 6,200 ohms and the value of component 13 was 6,400 ohms. The value of component 12 varied between 20,000 ohms and several megohms without causing more than about 1% change in the apparent value of component 11. A factor ten change in the value of impedance of component 13 would not seriously affect the accuracy of the indication because the amount of current shunted around the galvanometer G will be small and merely reduces the galvanometer sensitivity without affecting the true bridge balance.

Figure 2 shows a view of the apparatus mounted in a case 21. Knob 26 is for the purpose of adjusting the value of the impedance in arm 14 and its pointer cooperates with a scale on the face of the case for indicating the value of arm 14. Jacks 22, 23 and 24 are supplied for receiving leads for connection to junctions A, B and C respectively as shown in Figure 1. The test leads for interconnecting the bridge with the component to be measured are represented in Fig. 1 by lines with an arrow at each end.

The test leads have not been shown in Figure 2 as any conventional test lead having a plug at one end and a probe or clip at the other end could be used.

In the drawing the adjustable impedance 14 has been shown as a resistor. This adjustable impedance could, of course, be a capacitor if the component to be measured is a capacitor. The voltage source 30 may be a direct current source for resistive measurements and must be an alternating current source for measurements of capacity.

I claim:

Bridge apparatus for measuring the resistance of a circuit component while it is connected in a circuit with two other serially connected resistance components in shunt therewith comprising, a bridge circuit having a first standard resistance and a second standard resistance having first and second terminals with a first terminal of each connected together to form a common junction, said first and second standard resistances forming ratio arms of the bridge, a source of direct current potential connected across said first and second standard resistances to the second terminals thereof, an adjustable resistance having a first terminal connected to the second terminal of the first standard resistance and a second terminal forming a first terminal of said bridge, an indicating means connected between the second terminal of said adjustable resistance and said common junction between said first and second standard resistances for indicating when said bridge is balanced, means for connecting the second terminal of said adjustable resistance and a second terminal of said second standard resistance to a resistance to be measured and means for connecting said common junction to a junction between the two components shunting said resistance to be measured, the resistance of the bridge being significantly lower than that of the circuit component being measured, said second standard resistance being substantially small compared to the shunting resistance component connected between said common junction of the first and second standard resistances and said second terminal of the second standard resistance, and the resistance of the other shunting resistance, which bridges said indicating means, being sufficiently high compared to that of said indicating means so that the sensitivity of said means is not seriously impaired, whereby precise readings are obtained of the resistance of the component being measured while connected in the bridge circuit irrespective of wide variations in the resistances of said resistance components in shunt therewith.

References Cited in the file of this patent

UNITED STATES PATENTS

| | | |
|---|---|---|
| 2,309,490 | Young | Jan. 26, 1943 |
| 2,508,446 | Conant | May 23, 1950 |
| 2,532,142 | Blumlein | Nov. 28, 1950 |